United States Patent
Zulfiquar

(10) Patent No.: US 9,732,911 B2
(45) Date of Patent: Aug. 15, 2017

(54) INTEGRATED PIPELINE PROTECTION SYSTEM

(71) Applicant: Mohammed Zulfiquar, Birmingham (GB)

(72) Inventor: Mohammed Zulfiquar, Birmingham (GB)

(*) Notice: Subject to any disclaimer, the term of this patent is extended or adjusted under 35 U.S.C. 154(b) by 302 days.

(21) Appl. No.: 14/546,299

(22) Filed: Nov. 18, 2014

(65) Prior Publication Data
US 2015/0136265 A1 May 21, 2015

Related U.S. Application Data

(60) Provisional application No. 61/905,381, filed on Nov. 18, 2013.

(51) Int. Cl.
| | | |
|---|---|---|
| *F17D 5/06* | (2006.01) | |
| *F17D 5/00* | (2006.01) | |
| *G01M 3/00* | (2006.01) | |

(52) U.S. Cl.
CPC ............... *F17D 5/06* (2013.01); *F17D 5/00* (2013.01); *G01M 3/00* (2013.01)

(58) Field of Classification Search
CPC .. F17D 5/06; F17D 5/00; G01M 3/00; G01M 3/18; G01M 3/243; G01M 3/182
USPC ........................................................ 138/104
See application file for complete search history.

(56) References Cited

U.S. PATENT DOCUMENTS

| | | | | |
|---|---|---|---|---|
| 2,759,175 | A * | 8/1956 | Spalding | G01M 3/045 138/104 |
| 8,640,527 | B2 * | 2/2014 | Hara | G01M 3/047 73/40.5 R |
| 9,341,316 | B2 * | 5/2016 | Novak | F17D 5/02 |
| 2004/0154380 | A1 * | 8/2004 | Walker | G01M 3/38 73/40.5 R |
| 2004/0232924 | A1 * | 11/2004 | Hilleary | C23F 13/22 324/700 |
| 2005/0255724 | A1 | 11/2005 | Picco et al. | |
| 2007/0043807 | A1 * | 2/2007 | Twitchell | H04L 67/125 709/201 |
| 2007/0284112 | A1 | 12/2007 | Magne et al. | |

(Continued)

FOREIGN PATENT DOCUMENTS

| | | | | |
|---|---|---|---|---|
| DE | 102011100731 A1 | 11/2012 | | |
| GB | WO 2008059226 A2 * | 5/2008 | .............. | G01M 5/00 |
| WO | 2008140490 A2 | 11/2008 | | |

*Primary Examiner* — Joshua Kennedy

(57) ABSTRACT

The pipeline protection system includes a plurality of modules and a central control unit. The modules are adapted to be disposed circumferentially around the pipeline and capable of communicating to each other and with the central control unit to generate a plurality of real time data related to the pipeline. The modules are retrofittable configuration that includes sub-modules. Each sub-module includes top and bottom protective casings, and at least one flexible composite layer disposed between the top and bottom protective casings. The flexible composite layer includes an electronic circuitry embedded thereon, and a plurality of sensors coupled to the electronic circuitry to monitor a plurality of parameters associated with the pipeline. The plurality of sensors is configured to generate various real time data, such as pipeline leakage, predict future leakage or failure, and detect any attempt to theft or tempering in the pipeline.

31 Claims, 5 Drawing Sheets

(56) References Cited

U.S. PATENT DOCUMENTS

| | | | |
|---|---|---|---|
| 2009/0308140 A1* | 12/2009 | Haseloh | G01M 3/2815 |
| | | | 73/40.5 R |
| 2013/0168336 A1 | 7/2013 | Kim et al. | |
| 2015/0098539 A1* | 4/2015 | Iann | H04W 56/001 |
| | | | 375/356 |
| 2015/0136234 A1* | 5/2015 | Zulfiquar | F17D 3/01 |
| | | | 137/1 |
| 2015/0350752 A1* | 12/2015 | Solomon | H04Q 9/04 |
| | | | 340/870.01 |
| 2016/0238547 A1* | 8/2016 | Park | C08K 7/00 |

\* cited by examiner

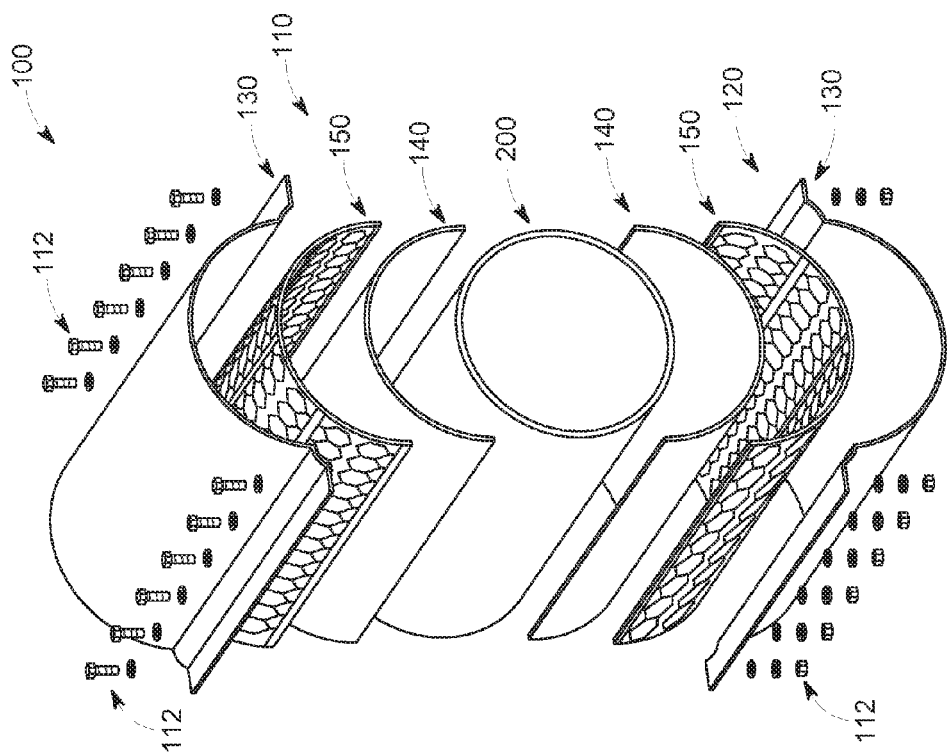
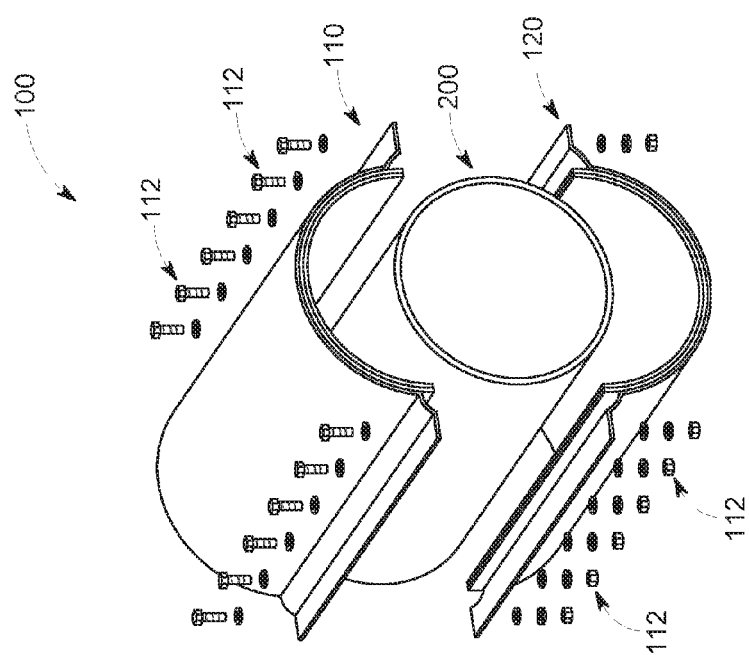

INTEGRATED PIPELINE PROTECTION SYSTEM

CROSS-REFERENCE TO RELATED PATENT APPLICATION

This application is the non-provisional filing of provisional application No. 61/905,381, filed 18 Nov. 2013 and titled Critical Infrastructure Pipeline Protection System (CIPPS).

BACKGROUND

Field of Endeavor

The present disclosure relates to the field of pipeline monitoring and protection, and more particularly, an integrated pipeline monitoring and protection system.

Brief Description of the Related Art

Pipelines are most significant mode for transporting fluid fuels, such as Oil and Gas; equally significant is its monitoring and protection from various unwanted issues, such as leakage, theft etc. Such unwanted issues directly or indirectly affect the oil and gas communities and environment throughout the world. In Nigeria alone, for instance, oil pipeline theft reduces output by approximately 15% per annum representing a loss of more than $7 billion. Due to the sensitivity of these thefts, the true figure may be even greater than the considerable 16,083 recorded pipeline breaks in the last decade. Similarly, leakage in the pipelines is great threat to environment, which badly affects surroundings and living beings around the leakage area.

Various efforts in past 50 years have been made from time to time to overcome such unwanted issues in selected regions across the pipelines path using methods or tools, such as conducting statistical analysis, performing airborne reconnaissance, regular monitoring of pressure in the pipelines, using Computational Pipeline Monitoring (CPM) software, etc. Further, such methods and tools are limiting in respect of the factors required to be monitored in a particular region of the pipeline for which an exhaustive separate analysis is made on the pipes before its installation. For example, if a pipe in a pipeline is required to be installed in pressure sensitive areas, such as in deep sea or ocean or above the hills, then the pipe is required to be tested under various pressure conditions before installation. After installation, such pipes are installed with such CPM software that is capable of monitoring pressure regularly. In such an event, other parameters relating to the pipeline in those areas may get ignored which risks pipeline failure due to the factors that may not be assumed or have been ignored. It means that the presently available pipelines are always lacking integrity in terms of risk due to various unknown factors that may also result in pipeline leakage, failure or theft at any portion of the entire pipeline.

Furthermore, wherever such methods or tools are installed along the pipelines, they are generally utilized as data collection tools or method which sends all the collected data to a specific data center for processing, which increases the load on the data center and delays the information relevant to the pipeline.

In regard to all the above problems very few innovations have taken place in the pipeline integrity, where the entire pipeline is prevented or monitored on a regular basis and that also reduces such delays in generating data and reducing load on the central servers. This is largely due to the fact that the pipelines were new and risks were determined to be low. In addition, the value of oil or gas was relatively low, at around $10 per barrel, which made pipeline theft virtually non-existent. The world today now has a far different landscape as the price of oil and gas per barrel hovers around $100. Because of the changes, the oil and gas industry is desperate to address the massive financial losses and environmental degradation that are associated with both pipeline theft and leakage. In addition, the pipeline industry is grappling with mounting regulatory pressures.

Unfortunately, the lack of innovation and effective investment in research and development to address these issues has meant that the solutions 20 years ago are no different to the ones offered today by servicing companies. Accordingly, there exists a need for innovation in relation to the pipeline integrity, where the entire pipeline is prevented or monitored on a regular basis and that also reduces such delays in generating data and reducing load on the central servers.

SUMMARY

The present disclosure describes an integrated pipeline monitoring and protection system in the pipeline utilized for carrying fluids such as oil and gas. This will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe an integrated pipeline monitoring and protection system, which will offer real time monitoring and protection of the entire pipeline regarding leakage, theft or even predict future leakage and enables to take preventive measures to avoid such leakage or theft. Another object of the present disclosure is to provide such module that may be installed along the entire pipeline to enable pipeline integrity in terms of protection of the entire pipeline as against the available prior-art technologies which are largely based on the protection or presentation of specific regions of the pipeline. Another object of the present disclosure is to provide such a module that is capable of monitoring, if required, all the relevant parameters of the pipelines in a cost effective manner as against the available prior-art technologies where specific tools or methods are incorporated on the pipeline which are only required in that region of the pipeline because of huge costs involved in installing all the tools and methods at each location of the pipelines. Another object of the present disclosure is to provide such module or system that is capable of generating real time data of the pipeline and at the same time reduce the processing load on a central server. Various other objects and features of the present disclosure will be apparent from the following detailed description and claims.

The above noted and other objects, in one aspect, may be achieved by an integrated pipeline protection system of the present disclosure. The system includes a plurality of modules and a central control unit adapted to be communicably configured to the plurality of modules. In one embodiment, each module includes at least one flexible composite layer, at least one layer of electronic circuitry and a plurality of nanosensors. The layer of electronic circuitry is embedded on the flexible composite layer, and includes a plurality of microchips embedded on each layer thereof. Further, the nanosensors are also embedded on the flexible composite layer in coupling relationship with the electronic circuitry and microchips. A combinational arrangement of the nanosensors, the electronic circuitry and the microchips on the flexible composite layer are capable to monitor and process a plurality of parameters, associated with the pipeline to generate at least one of the plurality of real time data relating to the pipeline, such as pipeline leakage, prediction of stress and strain, fatigue measurement, corrosion and erosion, future leakage or failure, and detection of any attempt to theft or tempering in the pipeline.

In one embodiment, the plurality of modules are adapted to be circumferentially disposed, in spaced or closed relation to each other, to various portions of a pipeline and capable of communicably configured to each other to generate a plurality of real time data relating to the pipeline. Each of the plurality of modules includes, in an example, a retrofittable configuration which is adapted to include at least two sub-modules coupled to snugly disposed circumferentially around the portion of the pipeline.

In one embodiment, each sub-module includes top and bottom protective casings adapted to encase the at least one flexible composite layer from the top and bottom side of the flexible composite layer. The top casing may change to suit specific requirements or application, for example, the outer casing may be of a single layered structure or of multiple layered structures. Similarly, the flexible composite layer may as per specific demand be produced in a single piece or in various pieces. For example, in one embodiment, the a typical size of one piece of the flexible composite layer may be of size 9 meters with 8 inches diameter, which is a typical size for one piece of a pipe length.

Further, the central control unit which is adapted to communicably configure with the plurality of modules receives such real time data related to the pipeline and generate a plurality of related information of the pipeline. In one further preferred embodiment, in the combinational arrangement of the nanosensor, the electronic circuitry and the microchips, at least one of the nanosensor is a GPS (Global Positioning System) nanosensor, which with association of the electronic circuitry and the microchips, is adapted to coordinate with a GPS satellite to enable the communication between the plurality of modules and the central control unit.

In one embodiment of the present disclosure, the combinational arrangement of the nanosensor, the electronic circuitry and the microchips are printed on the flexible composite layer in one of more circuitry design formats as desired by the pipeline's location and position. In such embodiment, the flexible composite layer may be a graphene nanosheet or an intelligent Polyethylene Terephthalate (PET) substrate. Further, the nanosensors, which may be smart transistor nanosensors, and the electronic circuitry along with the microchips printed on the graphene nanosheet or on the intelligent PET substrate.

In one embodiment, the smart transistor nanosensors are printed on the flexible composite layer via a printing material comprised of a mixture of conductive inks including silver, copper, gold and carbon composites. Similarly, various other types of sensors with specific functioning and monitoring are adapted in such sensor matrix over the graphene nanosheet, which in association with the combinational arrangement of the nanosensor, the electronic circuitry and the microchips, may monitor various parameters related to pipeline leakage, predict future leakage or failure, and detect any attempt to theft or tempering in the pipeline, generating real time data to send it to the central control unit, which generates various information that help in making prediction of future failure of the pipeline and also information related to present leakage and theft attempt and generate alarm to concerned authorities.

In the combinational arrangement of the nanosensor, the electronic circuitry and the microchips, each of the microchip is adapted to include a standard software, which in coordination with the nanosensor and the electronic circuitry, generate or monitor specific real time data related to the pipeline leakage along the pipeline In one preferred embodiment, the flexible composite layer may be electrically conductive, which when applied to voltage is capable of, in association with combinational arrangement of the nanosensor, the electronic circuitry and the microchips, mimicking the behavior of the pipeline, in event of leakage, theft and regular monitoring of various parameters of the pipelines, for example, corrosion in the pipeline, strain created by internal expending force of fluid in the pipeline, condition of peripheral interface of the pipelines, changes in temperature, pressure, humidity, shocks, vibrations, and toxic gases along with the position along the pipeline, etc.

For doing so, the matrix configuration of the combinational arrangement of the nanosensor, the electronic circuitry and the microchips may be arranged in a manner where at least one set of nanosensors and the microchips are configured to measure at least one real time data relating to pipeline leakage along the pipeline. The real time data relating to pipeline leakage may include fluid leakage frequency and amount, and fluid leakage position and the like. Similarly, in the combinational arrangement of the nanosensor, the electronic circuitry and the microchips, at least another one set of nanosensors and microchips may be configured to measure at least one real time data relating to pipeline security breach along the pipeline. The real time data related to security breach includes tempering, damage or rupture of the pipeline and position thereof along the pipeline. In both the above scenarios, the system, in such embodiments, may include a shutdown-valve coupled to the pipeline, which may be actuated via a set of sensors in event of the leakage or tempering, damage or rupture of the pipeline. Similarly to above, in the combinational arrangement of the nanosensor, the electronic circuitry and the microchips, at least another one set of nanosensors and the microchips are may be configured to measure at least one real time data to regularly monitor general parameters of the pipeline and predict future leakage to enable preventive maintenance of the pipeline at that location. The real time data relating to estimated future leakage and regular monitoring of the pipeline may include, but not limiting to, corrosion in the pipeline, strain created by internal expending force of fluid in the pipeline, condition of peripheral interface of the pipelines, changes in temperature, pressure, humidity, shocks, vibrations, toxic gases along with the position along the pipeline, and the like.

In one further preferred embodiment, the system may further include at least one failsafe layer configured on the flexible composite layer. The fail safe layer may include a plurality of photonics boxes on the flexible composite layer in coordination with the combinational arrangement of the nanosensor, the electronic circuitry and the microchips, wherein the photonics boxes are actuated via voltage to generate information signals in event of leakage, security breach, breakage and monitor of the pipeline on real time basis.

In one further preferred embodiment, the system may further include a photovoltaic arrangement disposed on the flexible composite layer in coordination with the combinational arrangement of the nanosensor, the electronic circuitry and the microchips to generate required voltage for the operation of the photonics boxes and the flexible composite layer.

In one further preferred embodiment, the system may further include a provision of alarming signal in event of any default. Specifically, in the combinational arrangement of the nanosensor, the electronic circuitry and the microchips, at least one microchip may be an alarming microchip with an integrated software, which in combination of the nanosensor and the electronic circuitry is adapted to generate alarming signal, the signal being audio, smoke, visual lights, in event of leakage or security breach of the pipeline.

In one further preferred embodiment, the system may include a dielectric coating layer coated over the flexible composite layer to protect the flexible composite layer and the combinational arrangement of the nanosensor, the electronic circuitry and the microchips.

In another aspect, the disclosure also provides a module and method for making the module that is capable of ensuring pipeline protection in an integrated pipeline protection system, when configured on the pipeline.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawings, wherein like elements are identified with like symbols, and in which:

FIG. 2A illustrates assembled view of a module that is configurable on pipelines, in accordance with an exemplary embodiment of the present disclosure;

FIG. 2B illustrates exploded view of a module that is configurable on pipelines, in accordance with an exemplary embodiment of the present disclosure;

Like reference numerals refer to like parts throughout the description of several views of the drawings.

DETAILED DESCRIPTION OF THE PRESENT DISCLOSURE

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second," "top," "bottom," and the like, herein do not denote any order, elevation or importance, but rather are used to distinguish one element from another. Further, the terms "a" and "an" herein do not denote a limitation of quantity, but rather denote the presence of at least one of the referenced item.

Figure 1:
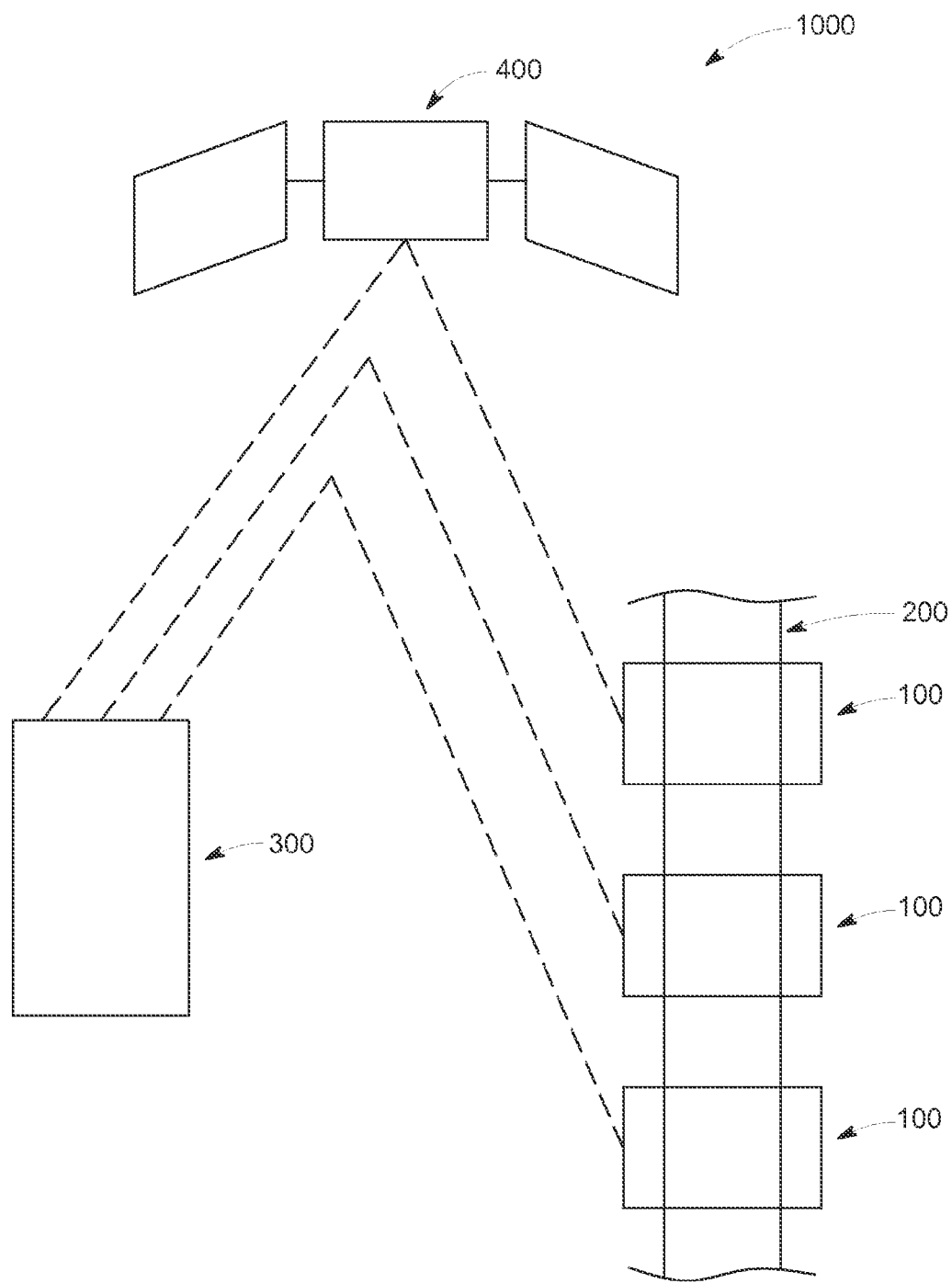
FIG. 1 illustrates block diagram of a pipeline protection system, in accordance with an exemplary embodiment of the present disclosure.

Referring now to FIG. 1, an example block diagram of a pipeline protection system 1000 (hereinafter referred to as 'system 1000') is illustrated. The system 1000 includes a plurality of modules 100 (hereinafter referred to as "module(s) 100") disposed at various locations along a pipeline 200, and is capable of communicating with a central control unit 300 (hereinafter referred to as "control unit 300") via a Global Positioning System (GPS) 400. Detailed explanation thereof will be made herein later with reference to FIGS. 2 to 4. As shown in FIG. 1, various modules 100 may be disposed over the pipeline 200. In one embodiment, the modules 100 are adapted to be circumferentially disposed, in spaced or closed relation to each other, to various portions of the pipeline 200 and are capable of communicably configured to each other to generate a plurality of real time data related to the pipeline 200 and communicate it to the control unit 300 via GPS 400. The real time data related to the pipeline may include pipeline leakage data, predict future leakage or failure data, and detect any attempt to theft or tempering related data in the pipeline 200. Further, the control unit 300, which is adapted to communicably configured with the modules 100 receives relevant real time data related to the pipeline and generate a plurality of related information of the pipeline that enables to determine the control authorities any potential leakage, or future leakage that may occur or if there is any attempt of theft or tempering in the pipeline 200, and accordingly enables the concerned authorities to act.

Referring now to FIGS. 2A and 2B, wherein assembled and exploded view of the module 100 are respectively illustrated, in accordance with an exemplary embodiment of the present disclosure, and will be described in conjunction with FIG. 1. The module 100 includes a retrofittable configuration which is adapted to include at least two sub-modules 110, 120, which can be coupled to each other to be snugly disposed circumferentially around various portions of the pipeline 200. The sub-modules 110, 120 are coupled to each other via suitable attachments, for example, screws or nut-bolts attachments 112. In another example, the sub-modules 110, 120 may be pivotally coupled to each other via a suitable pivot attachment. For configuring the module 100 on the pipeline 200, the two sub-modules 110, 120 may be uncoupled from each other and subsequently disposed on the portion of the pipeline 200 where it is required to be disposed, and then coupled using the suitable attachments. Where the two sub-modules 110, 120 are attached to each other via the pivot attachment, it is required to be opened along pivot and secured around the pipeline 200, and subsequently coupled to the other side via suitable attachment like nut-bolts or screws.

Each sub-module 110, 120, as shown in FIG. 2B, includes top 130 and bottom 140 protective casings, and at least one flexible composite layer 150 (shown and explained in reference to FIGS. 3A and 3B) disposed between the top 130 and bottom 140 protective casings. Further, each sub-module includes at least one layer of electronic circuitry 160 embedded on the flexible composite layer 150. The electronic circuitry 160 comprising a plurality of microchips 162 embedded on each layer of the electronic circuitry 160. Furthermore, a plurality of nanosensors 170 (hereinafter referred to as nanosensors or nanosensor 170 as and when required and shown and explained in reference to FIGS. 3A and 3B) is embedded on the flexible composite layer 150 in coupling relationship with the electronic circuitry 160 and microchips 162. A combinational arrangement of the nanosensor 170, the electronic circuitry 160 and microchips 162 on the flexible composite layer 150 to monitor a plurality of parameters associated with the pipeline 200 and generate various real time data, such as mentioned above. Example of the parameter associated with the pipeline 200 may include all the relevant parameters that are capable of determining any leakage, future leakage or any attempt of theft in the pipeline, such as, corrosion in the pipeline, strain created by internal expending force of fluid in the pipeline, condition of peripheral interface of the pipelines, changes in temperature, pressure, humidity, shocks, vibrations, and toxic gases along with the position along the pipeline, etc.

In additional embodiment of the present disclosure, a dielectric coating layer 152 may be coated over the flexible composite layer 150 to protect the flexible composite layer 150 and the combinational arrangement of the nanosensor 170, the electronic circuitry 160 and microchips 162.

The top and bottom protective casings 130, 140 accommodate the flexible composite layer 150 therewithin in very secure and protective manner from any outside unwanted source, thereby making the module 100 full-proof. In FIGS. 2A and 2B, the arrangement of the sub-modules 110, 120 are illustrated for understanding purpose and may not be considered to be limiting to that specific arrangement, which can vary as per the customers and industry requirement. For example, each sub-module 110, 120 may include more such protective layers to provide additional protection to modules 100.

Figure 3A:
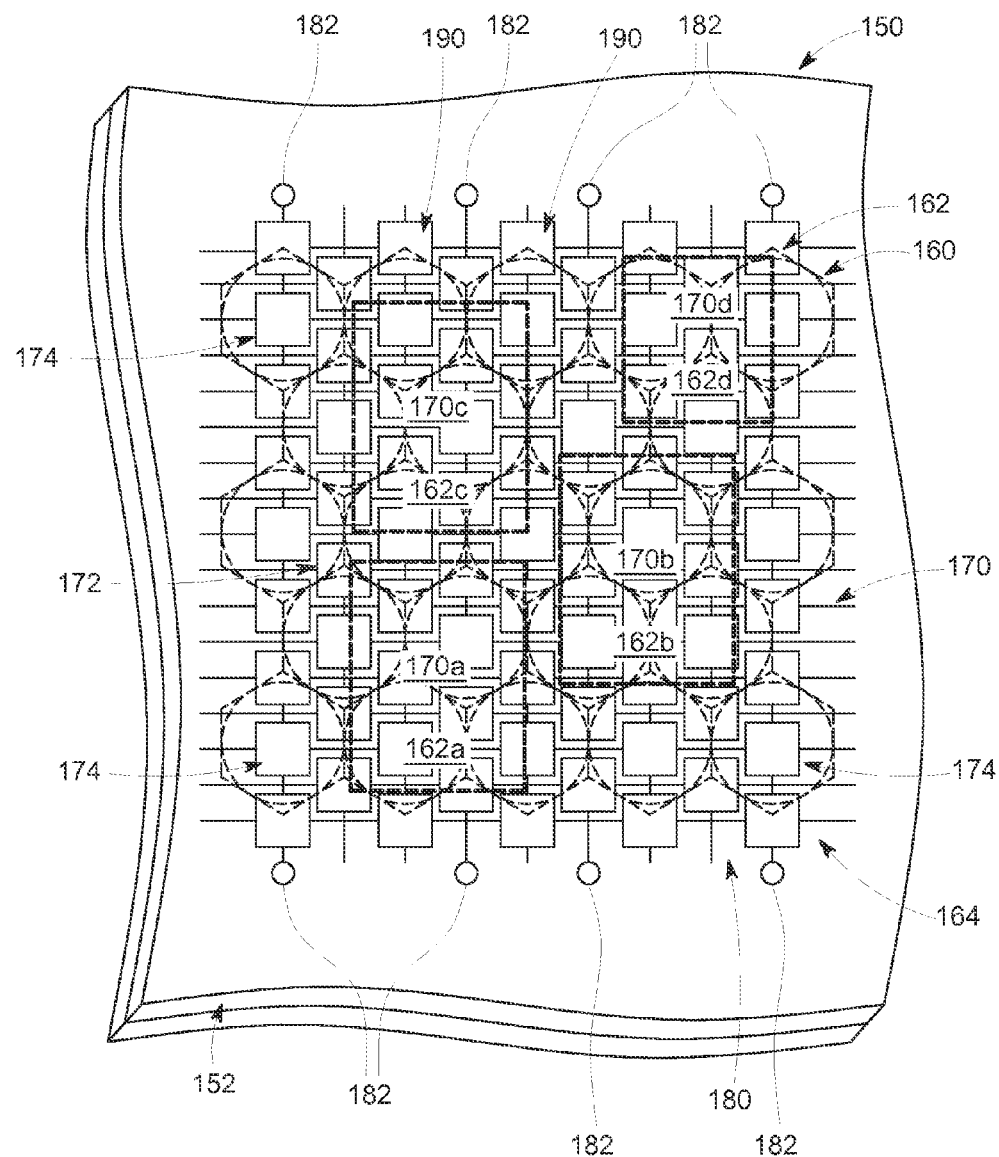
FIG. 3A illustrates an example diagram electronic circuitry and sensor arrangements over the flexible composite layer, in accordance with an exemplary embodiment of the present disclosure.
Figure 3B:
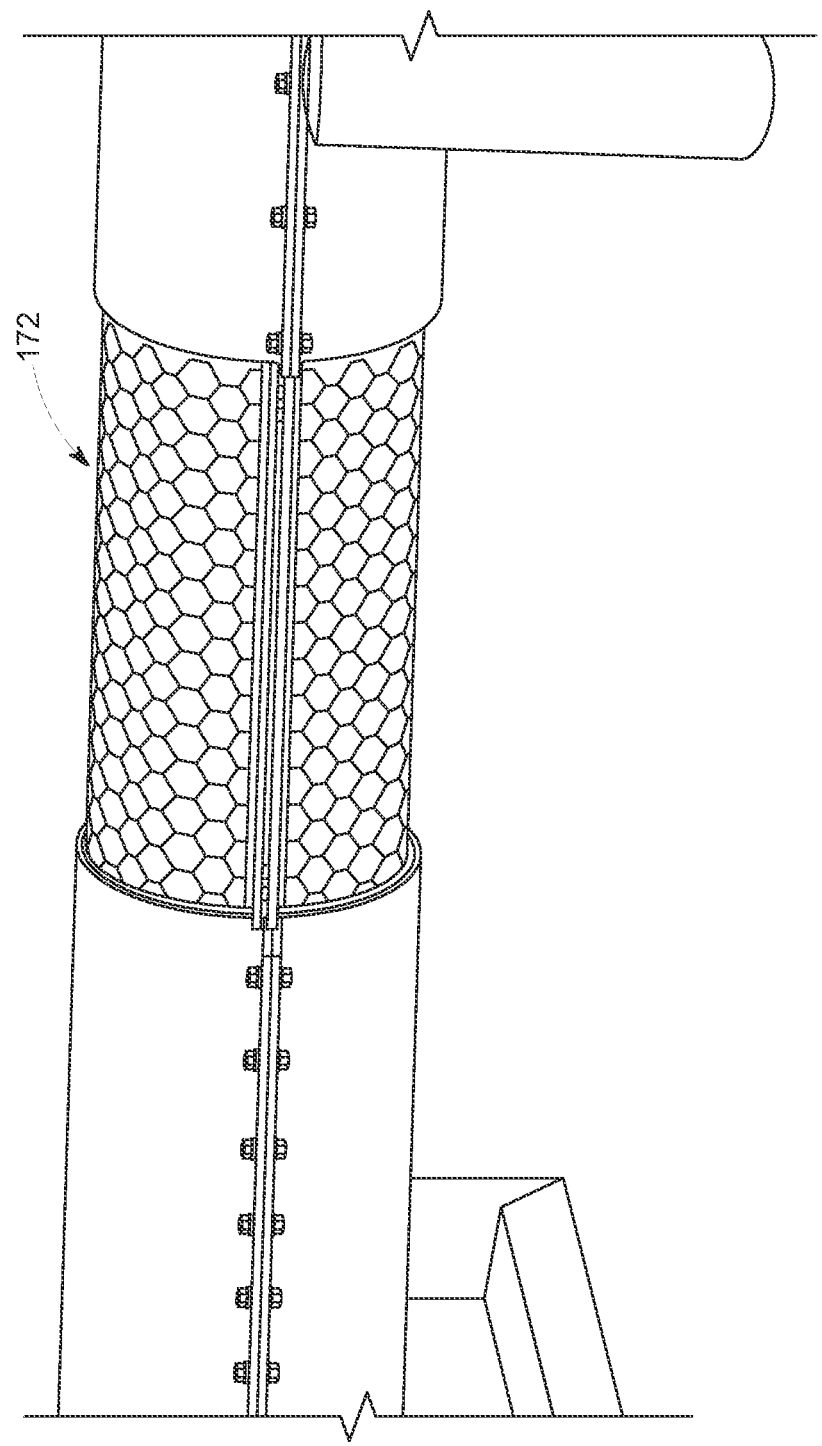
FIG. 3B illustrates a perspective view of the sensors arrangements and its monitoring of the pipeline, in accordance with an exemplary embodiment of the present disclosure.

Referring now to FIGS. 3A and 3B, wherein FIG. 3A illustrates, an example diagram of the combinational arrangement of the nanosensor 170, the electronic circuitry 160 and the microchips 162 over the flexible composite layer 150; and FIG. 3B illustrates, a perspective view of the combinational arrangement of the nanosensor 170, the electronic circuitry 160 and microchips 162 and its monitoring of the pipeline 200.

As shown in FIG. 3A, the flexible composite layer 150 has the combinational arrangement of the electronic circuitry 160, the microchips 162 and the sensor arrangements 170 configured thereon. In example embodiment, the combinational arrangement of the electronic circuitry 160, the microchips 162 and the sensor arrangements 170 are printed over the flexible composite layer 150. In such embodiment, the flexible composite layer 150 may be graphene nanosheet made of the intelligent Polyethylene Terephthalate (PET). Further, the nanosensors 170, for example, may be smart transistor nanosensors. The smart transistor nanosensors 170, electronic circuitry 160 and the microchips 162 are printed over the graphene nanosheet 150 with closed coordination while maintaining sensors' tolerances, escalation mechanisms forming a crystal lattice structure of a matrix 172 of the combinational arrangement of the electronic circuitry 160, the microchips 162 and the sensor arrangements 170 over the graphene nanosheet, such as shown in FIGS. 3A and 3B.

The matrix 172 may be formed by printing combinational arrangement of the electronic circuitry 160, the microchips 162 and the sensor arrangements 170 in rows and columns pattern. The intersection of these rows and columns creates a sensing cell 174 for sensing desired parameters related to pipeline 200. The spacing between the rows and columns may vary according to sensor 170 and the microchip 162 applications based on which parameters related to pipeline 200 are required to be sensed and measured. For example, an array of force sensitive cells or pressure sensors along with the respective software coded microchip enables to sense and measure the pressure distribution in the pipeline at the specific location.

In one embodiment, the printing material comprised of a mixture of conductive inks including silver, copper, gold and graphene composite. Further, in one preferred embodiment, the flexible composite layer 150 may also be electrically conductive, to which, when voltage is applied, in association with matrix 172 obtained by the combinational arrangement of the electronic circuitry 160, the microchips 162 and the sensor arrangements 170, mimic the behavior of the pipeline 200, in event of leakage, theft and regular monitoring of various parameters of the pipeline 200. For example, when voltage is applied, sensors cell 174, which may be octagonal sensors cells 174 slip in and out the crystal lattice structure, which acts as synapse channel between two interfaces of the octagonal sensors cell 174. Due to that, the varying concentration of ions raises or lowers its conductance that transforms into ability to carry information about relevant parameters via the microchips 162 which incorporates respective software. This arrangement of the flexible composite layer 150, the electronic circuitry 160, the microchip 162 and the sensors 170 continuously monitors the changes in the pipeline 200, which provide real time data to the central unit 300.

The matrix 172 obtained by the combinational arrangement of the electronic circuitry 160, the microchips 162 and the sensor arrangements 170 over the graphene nanosheet 150 may monitor various parameters related to pipeline leakage, predict future leakage or failure, and detect any attempt to theft or tempering in the pipeline 200, generating real time data to send it to the central control unit, which generates various information that help in making prediction of future failure of the pipeline 200 and also information related to present leakage and theft attempt and generate alarm to concerned authorities. The parameter that may be monitored include, but not limiting to, corrosion in the pipeline 200, strain created by internal expending force of fluid in the pipeline, condition of peripheral interface of the pipeline, changes in temperature, pressure, humidity, shocks, vibrations, and toxic gases along with the position along the pipeline, etc.

In one embodiment, the matrix 172 of the combinational arrangement of the nanosensor 170, the electronic circuitry 160 and the microchips 162 may be arranged in a manner where at least one set of nanosensors 170a and the microchips 162a are configured to measure at least one real time data relating to pipeline leakage along the pipeline 200. The real time data relating to pipeline leakage may include fluid leakage frequency and amount, and fluid leakage position and the like. Similarly, in the combinational arrangement of the nanosensor 170, the electronic circuitry 160 and the microchips 162, at least another one set of nanosensors 170b and the microchips 162b may be configured to measure at least one real time data relating to pipeline security breach along the pipeline 200. The real time data relating security breach including, but not limited to, tempering, damage or rupture of the pipeline and position thereof along the pipeline 200.

In both the above scenarios, the system 1000, in such embodiments, may include a shutdown-valve (not shown) coupled to the pipeline 200, which may be actuated via the nanosensors 170a, 170b and the microchips 162a, 162b in event of the leakage or tempering, damage or rupture of the pipeline.

Similar to the above, the matrix 172 of the combinational arrangement of the nanosensor 170, the electronic circuitry 160 and the microchips 162 may be arranged in a manner where at least one another set of nanosensors 170c and the microchips 162c may be configured to measure at least one real time data to regularly monitor general parameters of the pipeline 200 and predict future leakage to enable preventive maintenance of the pipeline 200 at that location. The real time data relating to estimated future leakage and regular monitoring of the pipeline 200 may include, but not limiting to, corrosion in the pipeline, strain created by internal expending force of fluid in the pipeline 200, condition of peripheral interface of the pipeline 200, changes in temperature, pressure, humidity, shocks, vibrations, toxic gases along with the position along the pipeline 200, and the like.

Further, as shown in FIG. 3A, and explained in conjunction with FIG. 1, the matrix 172 of the combinational arrangement of the nanosensor 170, the electronic circuitry 160 and the microchips 162 may, includes at least some of the sensors, such as sensors 170d, to be position sensors. Such position sensors 170d in coordination with the electronic circuitry 160 may be capable of coordinating with all set of sensors 170a-170c and the microchips 162a-162c and send relevant data and position along the pipeline 200 to the control unit 300. In one embodiment, such position sensors 170d may be a GPS (Global Positioning System) 400 which is adapted to coordinate with a GPS satellite to enable the communication between the various modules 100 and the control unit 300.

Figure 4:
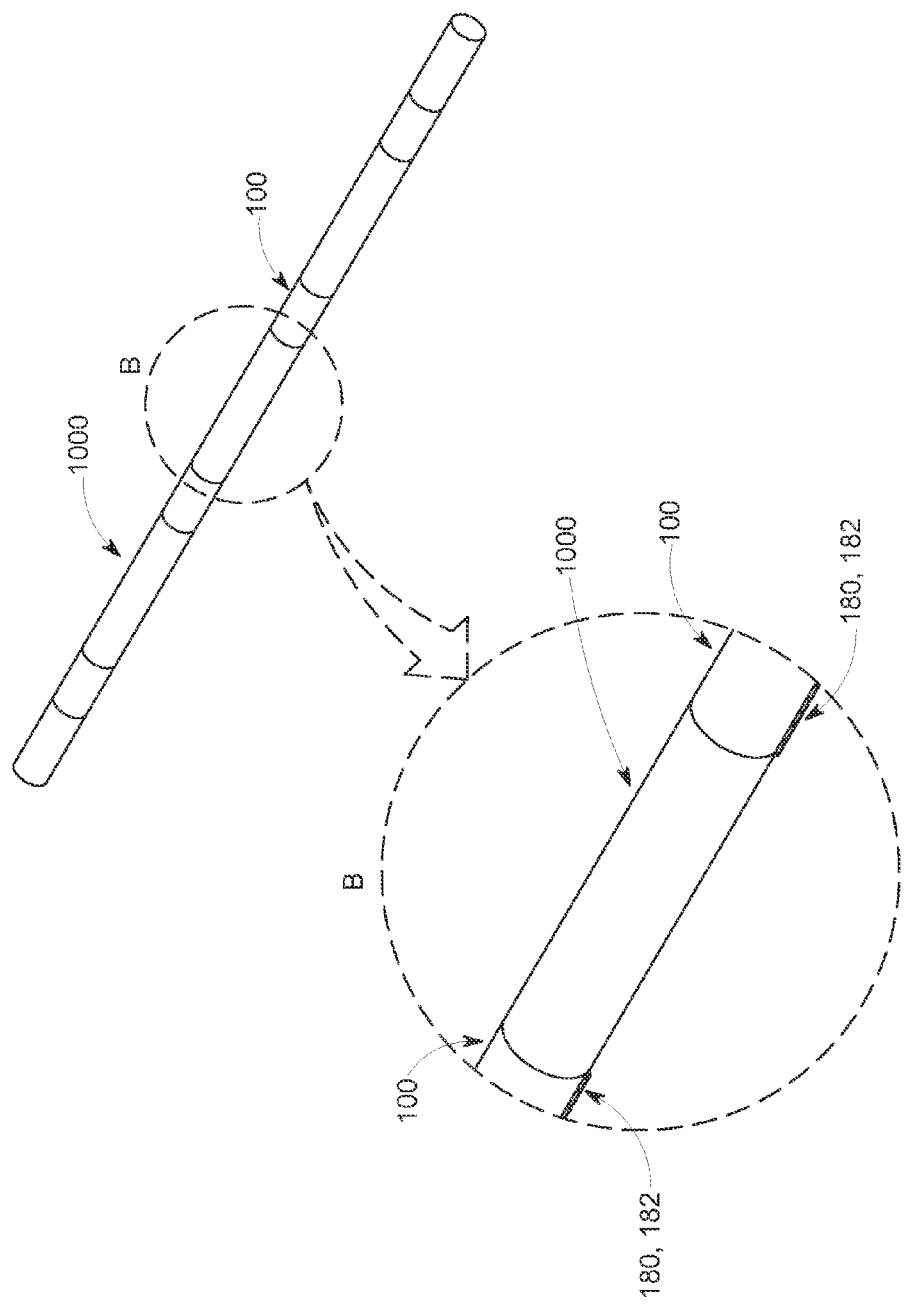
FIG. 4 illustrates perspective view of the various modules configured over the pipeline and applicability of photonics boxes in making the pipeline failsafe, in accordance with an exemplary embodiment of the present disclosure.

Referring now to FIG. 4, in one further preferred embodiment, the system 1000 may include at least one failsafe layer 180 configured on the flexible composite layer 150. The failsafe layer 180 may include a plurality of photonics boxes 182 on the flexible composite layer 150 in coordination with the combinational arrangement of the nanosensors 170, the electronic circuitry 160 and the microchips 162. The photonics boxes 182 may be actuated via voltage to generate information signals in event of leakage, security breach, breakage and monitoring of the pipeline 200 on real time basis, thereby making failsafe pipeline. The photonics boxes 182 in the failsafe layer 180, includes transmitting and receiving devices disposed at distal ends of the module 100, which are capable of transmitting and receiving laser lights through a fiber optics cable between the two adjacent modules 100 In the event of any breach in the pipeline 200, the photonics boxes 182 are in coordination with the nanosensors 170, the electronic circuitry 160 and the microchips 162, generates information signals until the primary system is restored. The failsafe layer 180 with the photonic boxes 182 may be capable of generating a single line or several lines with multi layers disposed on the flexible composite layer 150.

In one further preferred embodiment, the system 1000 may further include a layer of photovoltaic arrangement 190 disposed on the flexible composite layer 150 in coordination with the combinational arrangement of the nanosensor 170, the electronic circuitry 160 and the microchips 162 to generate required voltage for the operation of the photonics boxes 182 and the flexible composite layer 150 as described above.

In one further preferred embodiment, the system 1000 may further include a provision of alarming signal in event of any default. Specifically, in the combinational arrangement of the nanosensor 170, the electronic circuitry 160 and the microchips 162, at least one microchip 162 may be an alarming microchip 164 with an integrated software, which in combination of the nanosensor 170 and the electronic circuitry 160 is adapted to generate alarming signal, in event of leakage or security breach of the pipeline. The signal may be audio, smoke or visual lights.

In any event of failure or leakage of the pipeline 200, the system 1000 with the help of module 100, specifically, the combinational arrangement of the nanosensor 170, the electronic circuitry 160 and the microchips 162, is capable of generating real time data at the site of conflicts of the pipeline 200 and sends only relevant data to the central control unit 300 via GPS 400, in turn reducing the processing load on a central control unit 300. Alternatively, the module 100, specifically, the combinational arrangement of the nanosensor 170, the electronic circuitry 160 and the microchips 162, is capable of generating real time data at the site of conflicts of the pipeline 200 and sends all data to the central control unit 300 via GPS 400, if required.

The system of the present disclosure is advantageous in various scopes. The system preclude conventional technique of generation limited information related to pipelines and provides integrated pipeline monitoring and protection system, which is capable of offering real time monitoring and protection of the entire pipeline regarding leakage, theft or predict even future leakage and enables to take preventive measures to avoid such leakage. Further, the module of the present disclosure may be installed along the entire pipeline to enable pipeline integrity in terms of protection of the entire pipeline as against the available prior-art technologies which are largely based on the protection or presentation of specific regions of the pipeline. Furthermore, the module of the present disclosure may be capable of monitoring, if required, all the relevant parameters of the pipelines in a cost effective manner as against the available prior-art technologies where specific tools or methods are incorporated on the pipeline which are only required in that region of the pipeline because of huge costing involved in installing all the tools and methods at each location of the pipelines. Moreover, the module or system of the present disclosure is capable of generating real time data of the pipeline and at the same time reduce the processing load on a central control unit. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical applications, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An integrated pipeline protection system, comprising:
a pipeline;
a plurality of modules adapted to be disposed to portions of an entire pipeline and capable of communicably configured to each other to generate a plurality of real time data relating to the pipeline, each of the plurality of modules comprising,
at least one flexible composite layer,
at least one layer of electronic circuitry embedded on a flexible composite layer of the at least one flexible composite layer, a layer of electronic circuitry of the at least one layer of electronic circuitry comprising a plurality of microchips embedded thereon, wherein each microchip of the plurality of microchips comprises coded software, and
a plurality of nanosensors embedded on the flexible composite layer in coupling relationship with the layer of electronic circuitry and the microchips to form a combinational arrangement of the plurality of nanosensors, the layer of electronic circuitry and the microchips on the flexible composite layer, wherein the combinational arrangement of the plurality of nanosensors, the layer of electronic circuitry and the microchips on the flexible composite layer obtains a matrix in a rows and columns pattern, wherein intersections of the rows and columns pattern create sensing cells for sensing a respective parameter of a plurality of parameters related to the pipeline and the microchip with the coded software monitors and processes the respective parameter of the plurality of parameters associated with the pipeline to generate at least one of the plurality of real time data relating to the pipeline; and
a central control unit adapted to be communicably configured to the plurality of modules to receive the plurality of real time data relating to the pipeline to generate a plurality of related information of the pipeline.

2. The integrated pipeline protection system as claimed in claim 1, wherein each of the plurality of modules further comprises a retrofittable configuration which is adapted to include at least two sub-modules coupled to be snugly disposed circumferentially around the portion of the pipeline, wherein each sub-module comprises top and bottom protective casings adapted to encase the at least one flexible composite layer from the top and bottom side of the flexible composite layer.

3. The integrated pipeline protection system as claimed in claim 1, wherein the combinational arrangement of the nanosensor, the electronic circuitry and microchips are printed on the flexible composite layer in one of more circuitry design formats as desired by the pipeline's location and position.

4. The integrated pipeline protection system as claimed in claim 1, wherein the flexible composite layer is a graphene nanosheet.

5. The integrated pipeline protection system as claimed in claim 1, wherein the flexible composite layer is an intelligent Polyethylene Terephthalate (PET) substrate.

6. The integrated pipeline protection system as claimed in claim 1, wherein the nanosensors are smart transistor sensors printed on the flexible composite layer.

7. The integrated pipeline protection system as claimed in claim 1, wherein the at least one flexible composite layer is electrically conductive, which when applied to the voltage is capable of, in association with combinational arrangement of the nanosensor, the layer of electronic circuitry and microchips, mimicking the behavior of the pipeline.

8. The integrated pipeline protection system as claimed in claim 1, further comprising at least one failsafe layer configured on the flexible composite layer, the failsafe layer having a plurality of photonics boxes on the flexible composite layer in coordination with the combinational arrangement of the nanosensor, the electronic circuitry and microchips, wherein the photonics boxes are actuated via voltage to generate information signals in event of leakage, security breach, breakage and monitoring of the pipeline on real time basis.

9. The integrated pipeline protection system as claimed in claim 8, further comprising a layer of a photovoltaic arrangement disposed on the flexible composite layer in coordination with the combinational arrangement of the nanosensor, the electronic circuitry and microchips to generate required voltage for the operation of the photonics boxes and the flexible composite layer.

10. The integrated pipeline protection system as claimed in claim 1, wherein the combinational arrangement of the nanosensor, the electronic circuitry and microchips is configured to measure at least one real time data relating to pipeline leakage along the pipeline, the real time data relating to pipeline leakage comprising fluid leakage frequency and amount, and fluid leakage position.

11. The integrated pipeline protection system as claimed in claim 10, further comprising a shutdown-valve configured to be actuated via the set of sensors in event of the leakage of the pipeline.

12. The integrated pipeline protection system as claimed in claim 10, wherein in the combinational arrangement of the nanosensor, the electronic circuitry and microchips, each microchip is adapted to include a standard software related to specific real time data relating to the pipeline leakage along the pipeline.

13. The integrated pipeline protection system as claimed in claim 1, wherein the combinational arrangement of the nanosensor, the electronic circuitry and microchips is configured to measure at least one real time data to regularly monitor general parameters of the pipeline and predict future leakage to enable preventive maintenance of the pipeline at that location, the real time data relating to estimated future leakage of the pipeline comprising corrosion in the pipeline, strain created by internal expending force of fluid in the pipeline, condition of peripheral interface of the pipeline, changes in temperature, pressure, humidity, shocks, vibrations, toxic gases along with the position along the pipeline.

14. The integrated pipeline protection system as claimed in claim 13, wherein in the combinational arrangement of the nanosensor, the electronic circuitry and microchips, each microchip is adapted to include a standard software related to specific real time data to regular monitor general parameters of the pipeline and predict future leakage to enable preventive maintenance of the pipeline at that location.

15. The integrated pipeline protection system as claimed in claim 1, wherein combinational arrangement of the nanosensor, the electronic circuitry and microchips is configured to measure at least one real time data relating to pipeline security breach along the pipeline, the real time data relating security breach comprising tempering, damage or rupture of the pipeline and position thereof along the pipeline.

16. The integrated pipeline protection system as claimed in claim 15, further comprising a shutdown-valve configured to be actuated via the set of sensors in event of the security breach of the pipeline.

17. The integrated pipeline protection system as claimed in claim 15, wherein in the combinational arrangement of the nanosensor, the electronic circuitry and microchips, each microchip is adapted to include a standard software related to specific real time data to pipeline security breach along the pipeline, the real time data relating security breach comprising tempering, damage or rupture of the pipeline and position thereof along the pipeline.

18. The integrated pipeline protection system as claimed in claim 1, wherein in the combinational arrangement of the nanosensor, the electronic circuitry and microchips, at least one microchip is a memory chip configured on the flexible composite layer to store various data relating to the pipeline.

19. The integrated pipeline protection system as claimed in claim 1, wherein in the combinational arrangement of the nanosensor, the electronic circuitry and microchips, at least one of the nanosensor is a GPS (Global Positioning System) nanosensor, which with association of the electronic circuitry and the microchips, is adapted to coordinate with a GPS satellite to enable communication between the plurality of modules and the central control unit.

20. The integrated pipeline protection system as claimed in claim 1, wherein, in the combinational arrangement of the nanosensor, the layer of electronic circuitry and microchips, at least one microchip is an alarming microchip with an integrated software, which, in combination with the nanosensor and the electronic circuitry is adapted to generate an alarming signal, the alarming signal being audio, smoke, visual lights, in event of leakage or security breach of the pipeline.

21. The integrated pipeline protection system as claimed in claim 1, further comprising a dielectric coating layer coated over the flexible composite layer to protect the flexible composite layer and the combinational arrangement of the nanosensor, the layer of electronic circuitry and microchips.

22. A module to ensure pipeline protection in an integrated pipeline protection system, the module comprising:
at least one flexible composite layer
at least one layer of electronic circuitry embedded on the flexible composite layer of the at least one flexible composite layer, a layer of electronic circuitry of the at least one layer of electronic circuitry comprising a plurality of microchips embedded thereon, wherein each microchip of the plurality of microchips comprises coded software each layer thereof, and
a plurality of nanosensors embedded on the flexible composite layer in coupling relationship with the electronic circuitry and the microchips, wherein a combinational arrangement of the plurality of nanosensors, the layer of electronic circuitry and the microchips on the flexible composite layer to obtain a matrix in a rows and columns pattern, wherein intersections of the rows and columns pattern create sensing cells, wherein when the module is disposed on a portion of the pipeline, the sensing cells sense a respective parameter of a plurality of parameters related to the pipeline and the microchip with the coded software monitors and processes the respective parameter of the plurality of parameters associated with the pipeline to generate at least one of the plurality of real time data relating to the pipeline.

23. The module as claimed in claim 22, further comprising a retrofittable configuration which is adapted to include at least two sub-modules coupled to be snugly disposed circumferentially around the portion of the pipeline, wherein each sub-module comprises top and bottom protective casings adapted to encase the at least one flexible composite layer from the top and bottom side of the flexible composite layer.

24. The module as claimed in claim 22, further comprising at least one failsafe layer configured on the flexible composite layer, the failsafe layer having a plurality of photonics boxes on the flexible composite layer in coordination with the combinational arrangement of the nanosensor, the electronic circuitry and microchips, wherein the photonics boxes are actuated via voltage to generate information signals in event of leakage, security breach, breakage and monitoring of the pipeline on real time basis.

25. The module as claimed in claim 24, further comprising a layer of a photovoltaic arrangement disposed on the flexible composite layer in coordination with the combinational arrangement of the nanosensor, the electronic circuitry and microchips to generate required voltage for the operation of the photonics boxes and the flexible composite layer.

26. The module as claimed in claim 22, further comprising a dielectric coating layer over the flexible composite layer to protect the flexible composite layer and the combinational arrangement of the nanosensor, the electronic circuitry and microchips.

27. A method of making a module to ensure pipeline protection in an integrated pipeline protection system, the method comprising:
providing a flexible composite layer;
embedding at least one layer of electronic circuitry on the flexible composite layer, a layer of electronic circuitry of the at least one layer of electronic circuitry comprising a plurality of microchips embedded on the layer of electronic circuitry, wherein each microchip of the plurality of microchips comprises coded software, and
embedding a plurality of nanosensors on the flexible composite layer in coupling relationship with the layer of electronic circuitry and the plurality of microchips forming a combinational arrangement of the plurality of nanosensor, the layer of electronic circuitry and the microchips on the flexible composite layer to obtain a matrix in a rows and columns pattern, wherein intersections of the rows and columns create sensing cells, wherein when the module is disposed on a portion of the pipeline, the sensing cells sense a respective parameter of a plurality of parameters related to the pipeline and the microchip with the coded software monitors and processes the respective parameter of the plurality of parameters associated with the pipeline to generate at least one of the plurality of real time data relating to the pipeline.

28. The method as claimed in claim 27, further comprising encasing the at least one flexible composite layer from the top and bottom side of the flexible composite layer.

29. The method as claimed in claim 27, further comprising embedding at least one failsafe layer on the flexible composite layer, the failsafe layer having a plurality of photonics boxes on the flexible composite layer in coordination with the combinational arrangement of the nanosensor.

30. The method as claimed in claim 29, further comprising embedding a layer of photovoltaic arrangement disposed on the flexible composite layer in coordination with the combinational arrangement of the nanosensor, the electronic circuitry and microchips to generate required voltage for the operation of the photonics boxes and the flexible composite layer.

31. The method as claimed in claim 27, further comprising coating a dielectric layer over the flexible composite layer to protect the flexible composite layer and the combinational arrangement of the nanosensor, the electronic circuitry and microchips.

* * * * *